(12) United States Patent
LeTourneau

(10) Patent No.: US 7,111,728 B2
(45) Date of Patent: Sep. 26, 2006

(54) HOLDING DEVICE FOR A SOLAR-POWERED THERMOMETER

(76) Inventor: Ronald G LeTourneau, 6473 Marshall Rd., Canton, MI (US) 48187

( * ) Notice: Subject to any disclaimer, the term of this patent is extended or adjusted under 35 U.S.C. 154(b) by 96 days.

(21) Appl. No.: 10/485,000

(22) PCT Filed: Jul. 30, 2002

(86) PCT No.: PCT/EP02/08492

§ 371 (c)(1), (2), (4) Date: Jan. 26, 2004

(87) PCT Pub. No.: WO03/012383

PCT Pub. Date: Feb. 13, 2003

(65) Prior Publication Data

US 2004/0173476 A1    Sep. 9, 2004

Related U.S. Application Data

(60) Provisional application No. 60/308,944, filed on Jul. 30, 2001.

(51) Int. Cl.
*B65D 85/38* (2006.01)
*G01K 1/08* (2006.01)

(52) U.S. Cl. ........................ 206/306; 374/209
(58) Field of Classification Search ................ 206/305, 206/306, 569, 570, 363, 438, 459.1, 813; 211/85.13; 248/542; 374/158, 209
See application file for complete search history.

(56) References Cited

U.S. PATENT DOCUMENTS 3,321,068 A * 5/1967 Beach .................... 206/306
3,490,725 A * 1/1970 Speelman ............. 248/311.2
3,580,077 A * 5/1971 Blackman ............... 206/212
3,768,634 A * 10/1973 Creevy .................. 206/212
4,597,551 A * 7/1986 Ciechanowski et al. .... 248/314
D292,680 S * 11/1987 Chan .......................... D10/57
D298,219 S * 10/1988 Muller ........................ D10/57
5,109,864 A * 5/1992 Lu ............................ 374/151
D330,170 S * 10/1992 Arioka ....................... D10/60

FOREIGN PATENT DOCUMENTS

BE    778199 A    5/1972
DE    42 13 034 A    10/1993
GB    2148010 A    5/1985
JP    10241424    9/1998

OTHER PUBLICATIONS

English Abstract of DE 4 213 034; Oct. 28, 1993.
English Abstract of GB 2,148,010; May 22, 1985.
Patent Abstracts of Japan, vol. 1998, No. 14, Dec. 31, 1998 & JP 10 241424 A (Tec. Corp.), Sep. 11, 1998.

* cited by examiner

*Primary Examiner*—Anthony D. Stashick
*Assistant Examiner*—J. Gregory Pickett
(74) *Attorney, Agent, or Firm*—Brooks Kushman P.C.

(57) ABSTRACT

A holding device for an electronic thermometer, which has a solar cell and an electronic display formed an outer surface of the thermometer, comprises an elongated receiving body configured to allow exposure of the solar cell to receive solar energy therethrough when the thermometer is in the receiving body. The receiving body as inner and outer surfaces, which extend to a closed end and an opposite open end through which the thermometer is to be disposed. The inner surface is formed to complement the outer surface of the electronic thermometer to receive a portion of the thermometer disposed though the open end. The inner surface is formed adjacent the open end to complement and receive the display when the thermometer is disposed in the receiving body.

10 Claims, 2 Drawing Sheets

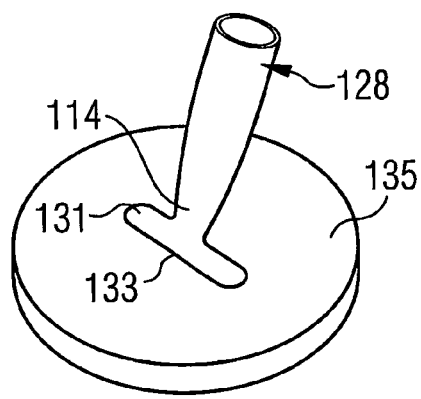
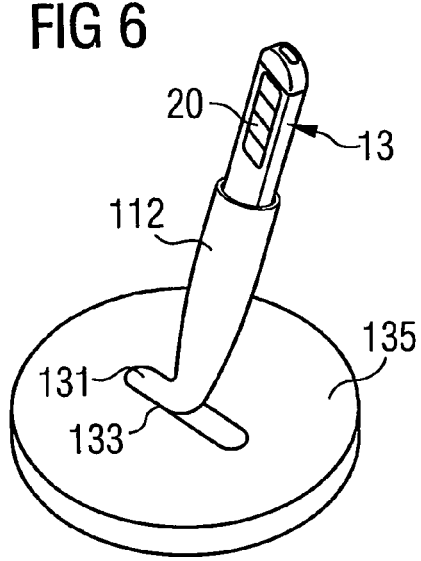
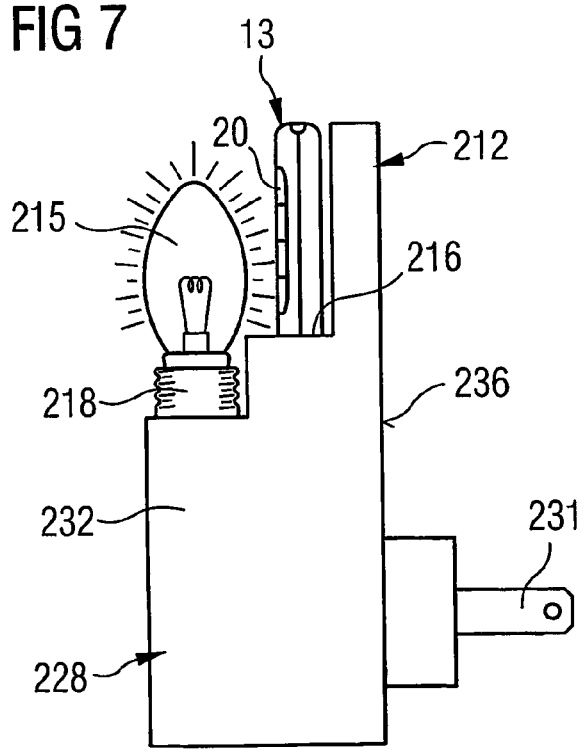

HOLDING DEVICE FOR A SOLAR-POWERED THERMOMETER

CROSS-REFERENCE TO RELATED APPLICATION

This application claims the benefit of U.S. provisional application Ser. No. 60/308,944, filed Jul. 30, 2001.

BACKGROUND OF THE INVENTION

The present invention relates to holding devices and assemblies for electronic clinical thermometers.

Clinical thermometers are thermometers of relatively high accuracy which are used in medical diagnosis and research. Such thermometers should be capable of measuring physiological temperatures with an accuracy of about 0.1° C., over an expected temperature range of about 34° C. to 42° C. In practice, the actual temperature range may be broader or narrower.

In the past, most clinical thermometers contained mercury as a thermometric fluid. However, mercury is quite toxic, and is rapidly being phased out. Thermometers of Galinstan®, a liquid metal alloy of gallium, indium, and tin, have been available for several years now. However, these thermometers tend to be relatively expensive, and like mercury thermometers, can be readily broken. Unlike mercury thermometers, however, thermometers employing Galinstan® thermometric fluid are non-toxic, and thus their use is steadily increasing.

Digital clinical thermometers have several advantages over classical liquid-filled thermometers, including easy reading, the ability to maintain a given reading for an extended time, and rapid and unambiguous reset. However, digital clinical thermometers have required a battery which results in several drawbacks. First, the battery must be regularly replaced, and the thermometer cannot be used if a replacement battery is not available. Second, the disposal of batteries, even the more common zinc/manganese dioxide batteries, raises environmental concerns with regard to land filling with transition metal-containing waste.

Digital thermometers employing solar cells have been used to monitor swimming pool temperatures. However, such devices are only operable in the light and require a large surface area solar cell. Thermometers having a battery have additionally employed a solar cell to minimise the drain on the battery. However, such devices cannot operate on the solar cell alone, and the battery must still be replaced.

Solar-powered digital clinical thermometers which allow for repeated temperature measurements, even in the dark, and which do not contain an environmentally unfriendly battery, can be stored in various locations. However, in order to recharge when solar energy is available, the thermometer needs to be held in a position suitable to receive solar energy.

SUMMARY OF THE INVENTION

It is an object of the present invention to provide a holding device for a solar-powered thermometer so as to allow the thermometer to receive sufficient solar energy when in the holding device.

The present invention meets this object by providing a holding device comprising an elongated receiving body configured to allow exposure of the solar cell of the thermometer to receive solar energy therethrough when the thermometer is disposed in the receiving body. The receiving body has inner and outer surfaces extending to a closed end and an opposite open end through which the thermometer is to be disposed. The inner surface is formed to complement the outer surface of the electronic thermometer to receive a portion of the thermometer disposed through the open end. The inner surface is formed adjacent the open end to complement and receive the display when the thermometer is disposed in the receiving body.

In another embodiment, the holding device comprises an elongated receiving body having inner and outer surfaces, wherein the surfaces having front and rear walls are integrally connected by side walls. The receiving body has first and second ends, wherein the first end has a bottom wall integrally connecting the front and rear walls to define a closed end. The second end is open to define an open end through which the thermometer is disposed. The inner surface complements the outer surface of the electronic thermometer to receive a portion of the outer surface. The front wall of the inner surface is concavely formed to complement and receive the display when the thermometer is disposed in the receiving body. The receiving body is configured to allow exposure of the solar cell to receive solar energy therethrough when the thermometer is disposed in the holding device.

The invention also relates to a thermometer holding assembly comprising an electronic thermometer and a holding device therefor.

BRIEF DESCRIPTION OF THE DRAWINGS

FIG. 5 is a perspective view of a holding device in accordance with yet another embodiment of the present invention;

FIG. 6 is a top view of the holding device of FIG. 5; and

FIG. 7 is a side view of the holding device in accordance with still another embodiment of the present invention,

DETAILED DESCRIPTION OF THE PREFERRED EMBODIMENTS

Figure 1:
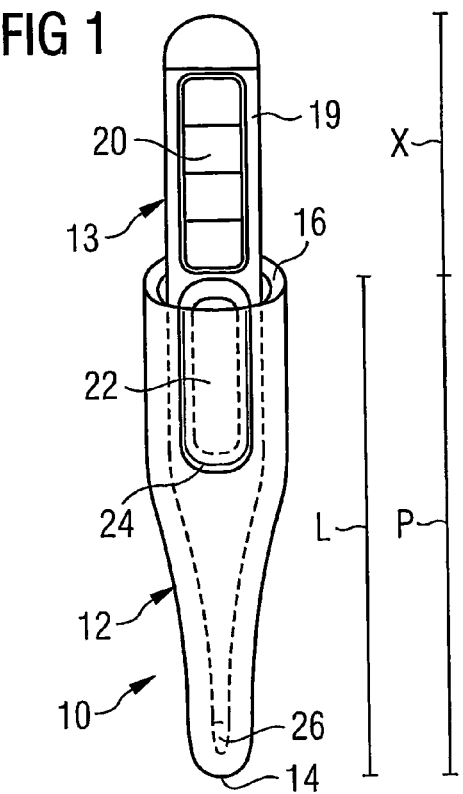
FIG. 1 is a front view of a thermometer assembly including an electronic thermometer and a holding device for the thermometer.

FIG. 1 illustrates an electronic thermometer assembly 10 including a holding device 12 and an electronic thermometer 13 being held therein. As shown, the holding device 12 has closed and opened ends 14, 16, respectively. The electronic thermometer 13 is fed through the open end 16 into holding device 12. Preferably, the thermometer 13 fits snugly in the holding device 12.

The thermometer 13 has an outer surface 19 which has solar cell 20 and display 22 disposed thereon. In this embodiment, the electronic thermometer is a solar-powered thermometer including a solar cell 20 for receiving solar energy therethrough to power thermometer 13. A display 22 includes a magnifying lens which convexly protrudes outward from the outer surface 19.

As depicted in FIG. 1, the sensor tip 26 of the thermometer 13 is inserted through the open end 16 to allow the display 22 to be held in the holding device 12 with a snug fit. The holding device 12 has a slot 24 formed thereon to receive the display 22 when the thermometer 13 is inserted through the open end 16. Thus, when the thermometer 13 is disposed within the holding device 12, the display 22 and the sensor tip 26 of the thermometer 13 are protected by the holding device 12, while allowing solar cell 20 to be exposed to light to allow solar energy to be received therethrough.

Figure 2:
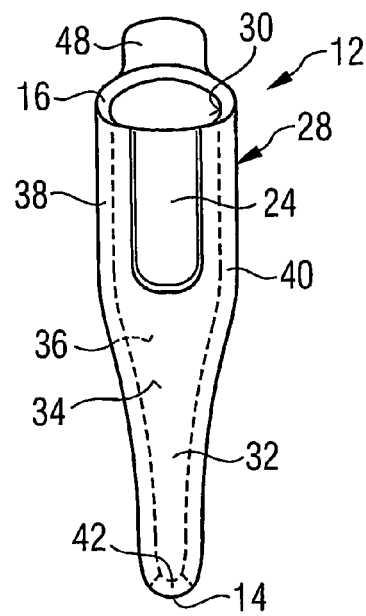
FIG. 2 is a front view of the holding device of FIG. 1.
Figure 3:
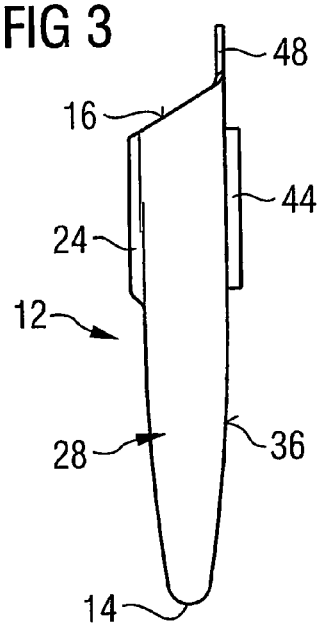
FIG. 3 is a side view of the holding device of FIG. 1.

FIGS. 2 and 3 depict the holding device 12 comprising an elongated receiving body 28, which includes an inner surface 30 and an outer surface 32, wherein the surfaces 30, 32 have a front wall 34 and a rear wall 36 integrally connected by side walls 38, 40. The receiving body 28 has a pair of first and second ends, wherein the first end has a bottom wall 42 integrally connecting the front and rear walls 34, 36 to define the closed end 14.

The inner surface 30 complements the outer surface 19 of the thermometer 13 to receive a portion of the outer surface 19. The front wall 34 of the inner surface 30 is concavely formed to define a slot 24 to complement and receive the display which is convexly formed relative to outer surface 19.

The holding device 12 is configured to allow the solar cell 20 of the thermometer 13 to receive solar energy for powering the thermometer 13 when the thermometer 13 is held therein. This is accomplished by forming the receiving body 28 so as to avoid overlap of the solar cell 20, allowing exposure of the solar cell 20 to receive solar energy therethrough when the thermometer 13 is disposed in the holding device 12.

In this embodiment, the inner surface 30 has a length L which allows the receiving body 28 to receive a first portion P of the thermometer 13 without overlapping or covering the solar cell 20.

In use, the thermometer 13, as held in receiving body 28, has exposed a second portion X which may be handled by a user for easy removal of the thermometer 13 from the receiving body 28. The receiving body 28 may have a length greater than L, but is formed to avoid exposure of the solar cell 20. Moreover, in this embodiment, the rear wall 36 includes a support 48 extending from the open end 16 to provide added support in holding the thermometer 13 in the receiving body 28. In this embodiment, the receiving body 28 is tapered from its open end 16 to its closed end 14.

As shown in FIG. 3, the holding device 12 may include mounting means thereon to mount the holding device 12 onto a surface. For example, as shown in FIG. 3, a pressure sensitive adhesive 44 may be attached to the rear wall 36. Any suitable pressure sensitive adhesive may be used. In use, the adhesive 44 may be mounted onto a rigid surface. As also shown, the front wall 34 of the outer surface 32 is formed convexly to complement the slot 24 of the inner surface 30, allowing the display 22 of the thermometer 13 snug fit in the holding device 12. Thus, the front wall 34 is configured to convexly protrude relative to the outer surface 32.

Figure 4:
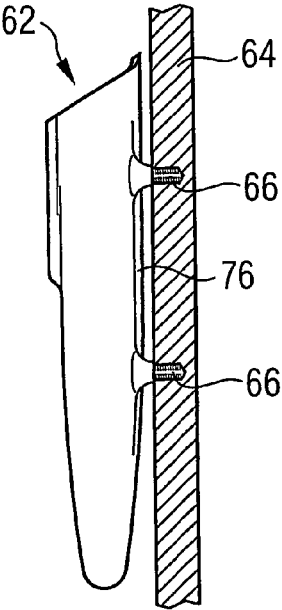
FIG. 4 is a holding device in accordance with another embodiment of the present invention.

FIG. 4 depicts another mechanism for mounting a holding device 62 onto a surface. As shown in FIG. 4, the holding device 62 may be mounted onto a surface 64 by screws 66. In this embodiment, a rear wall 76 may have apertures (not shown) formed thereon to allow screws 66 to be disposed therethrough and attached onto the surface 64. Other suitable means such as rivets may be used for attaching the holding device 62 onto a surface.

It is to be noted that such mounting means include means which attach the holding device to a surface which would not hinder the solar cell 20 of the thermometer 13 from receiving solar energy when inserted in the holding device. Although not wanting to limit the time during which the mounting means attach the holding device to a surface, such mounting means is configured to attach the holding device to a surface for up to a permanent time period and not only a temporary time period. Thus, such mounting means would not include a mechanism such as a clip mechanism allowing only temporary attachment to a garment.

FIG. 5 depicts another embodiment of a holding device 112 comprising a receiving body 128 having a bottom portion 114 attached to a foot 131. The receiving body 128 includes similar elements as the receiving body 28 of the first embodiment describe above. A foot 131 inserts into a groove 133 formed on a base 135. The base 135 is shown to be a circular body, but may take on any other suitable shape so long as the foot 131 may be inserted into the groove 133 to attach the receiving body 128 thereto. Preferably, the base 135 is mounted by any suitable means to a surface, such as a counter top.

In use, the foot 131, which is integrally attached to the receiving body 128, is inserted in the groove 133 to hold the receiving body 128 at an angle sufficient to allow the solar cell of the thermometer to receive solar energy. Thus, the receiving body 128 is held at an angle such that the thermometer 13, when disposed therein, may receive energy through the solar cell 120.

In the embodiment depicted in FIG. 7, the thermometer assembly 210 includes a holding device 212, an electronic thermometer 13 inserted in the holding device 212, and a light bulb 215 attached to the holding device 212. As shown, the assembly 210 is configured to be used as a night light attachable to an electrical outlet which, when powered, allows the light bulb 215 to emit light. In turn, the electronic thermometer which is disposed within the holding device 212 may receive solar energy emitted from light bulb 215 when the holding device 212 is plugged into an electrical outlet. In use, the assembly 210 serves as a night light and a recharger for the electronic thermometer 13.

As shown in FIG. 7, the holding device 212 includes an electrical socket 218 formed sufficiently adjacent the open end 216 so that when the light bulb 215 is in electrical contact with the socket 218, energy emitted from the bulb 215 is received by the solar cell 20 of the thermometer 13 inserted in the holding device 212. The holding device 212 further includes a plug 231 which extends from the rear wall 236 of the outer surface 232 of the receiving body 228. As shown, the plug 231 is attachable to an electrical socket (not shown). The plug is configured to be in electrical communication with the socket 218 to provide electrical power thereto when the light bulb 215 is in electrical contact with the socket 218, thereby, recharging the thermometer 13.

The invention claimed is:

1. A thermometer assembly comprising:
    a solar powered thermometer having a solar cell and a convex electronic display on an outer surface thereof, the convex electronic display comprising a magnifying lense; and
    a holding device comprising an elongated receiving body configured to allow exposure of the solar cell to solar energy when the thermometer is disposed in the receiving body, the receiving body having inner and outer surfaces extending to a closed end and an opposite open end through which the thermometer is to be disposed, the inner surface of the holding device being formed to envelop the outer surface of the electronic thermometer and to receive a portion of the thermometer disposed through the open end, the inner surface being formed adjacent the open end to complement and receive the display when the thermometer is in the receiving body, the outer surface of the receiving body including a mounting element for fixedly mounting the holding device to a generally planar surface, the receiving body having a front wall, a rear wall, and side walls connecting the front and rear walls, the front wall having a convex slot configured to allow viewing the convex display of the thermometer, and the thermometer having a length which allows the receiving body to receive a first portion of the thermometer while at least a substantial portion of a second portion of the thermometer is disposed above the receiving body, when the thermometer is snugly received within the holding device, with the convex display being disposed on the first portion of the thermometer and the solar cell being disposed on the second portion of the thermometer such that at least a substantial portion of the solar cell is disposed above the receiving body, when the thermometer is snugly received within the holding device.

2. The assembly of claim 1, wherein the mounting element comprises a pressure sensitive adhesive.

3. The assembly of claim 1, wherein the mounting element includes at least one mounting screw extending from its outer surface for mounting to said surface.

4. The assembly of claim 1, wherein the receiving body further includes a support extending from the open end to provide support to a thermometer extending through the open end.

5. The assembly of claim 1, wherein the second portion is disposed entirely above the receiving body when the thermometer is snugly received within the holding device.

6. The assembly of claim 2, wherein the second portion is disposed entirely above the receiving body when the thermometer is snugly received within the holding device.

7. The assembly of claim 3, wherein the second portion is disposed entirely above the receiving body when the thermometer is snugly received within the holding device.

8. The assembly of claim 1, wherein the solar cell is disposed entirely above the receiving body when the thermometer is snugly received within the holding device.

9. The assembly of claim 2, wherein the solar cell is disposed entirely above the receiving body when the thermometer is snugly received within the holding device.

10. The assembly of claim 3, wherein the solar cell is disposed entirely above the receiving body when the thermometer is snugly received within the holding device.

* * * * *